US012798670B2

(12) United States Patent
Gonschorek et al.

(10) Patent No.: US 12,798,670 B2
(45) Date of Patent: Nov. 17, 2026

(54) CONTROL METHOD FOR THE AUTOMATED CONTROL OF A TRANSVERSE DEVIATION AND/OR A STEERING WHEEL ANGLE OF A MOTOR VEHICLE, CONTROLLER, AND MOTOR VEHICLE

(71) Applicant: ZF Automotive Germany GmbH, Alfdorf (DE)

(72) Inventors: Robert Gonschorek, Düsseldorf (DE); Thomas Schubert, Kelberg (DE)

(73) Assignee: ZF Automotive Germany GmbH, Alford (DE)

( * ) Notice: Subject to any disclaimer, the term of this patent is extended or adjusted under 35 U.S.C. 154(b) by 195 days.

(21) Appl. No.: 18/498,297

(22) Filed: Oct. 31, 2023

(65) Prior Publication Data

US 2024/0149941 A1 May 9, 2024

(30) Foreign Application Priority Data

Nov. 4, 2022 (DE) ........................ 102022211644.5

(51) Int. Cl.
*B62D 6/00* (2006.01)
*B62D 5/04* (2006.01)

(52) U.S. Cl.
CPC ........... *B62D 6/008* (2013.01); *B62D 5/0463* (2013.01)

(58) Field of Classification Search
CPC .... B62D 6/008; B62D 5/0463; B62D 15/025; B62D 6/00; B60W 30/12; B60W 50/00; B60W 2050/0031
USPC ............................................................ 701/41
See application file for complete search history.

(56) References Cited

U.S. PATENT DOCUMENTS

2018/0106714 A1* 4/2018 Skold ...................... G01N 19/02
2019/0322313 A1* 10/2019 Münch .................. B60W 60/00
2022/0081024 A1* 3/2022 Roeckner ............. B62D 5/0403
2022/0371659 A1* 11/2022 Hambloch ............. B62D 6/008

FOREIGN PATENT DOCUMENTS

DE 102004035004 A1 2/2006
DE 102018206089 A1 10/2019

* cited by examiner

*Primary Examiner* — Scott A Reinbold
(74) *Attorney, Agent, or Firm* — Kristin L. Murphy

(57) ABSTRACT

A control method for automated control of a transverse deviation and/or a steering wheel angle of a motor vehicle by an overall control loop is described. The overall control loop has a first control module, a second control module, and at least one controlled system. The at least one controlled system comprises a front-axle actuator of the motor vehicle and/or a steering wheel of the motor vehicle. A provisional manipulated variable is determined by way of the first control module, wherein the provisional manipulated variable is independent of a speed of the motor vehicle. A final manipulated variable for the at least one controlled system is determined based on the provisional manipulated variable by way of the second control module, wherein the second control module compensates for a speed dependency of the at least one controlled system. A controller and a motor vehicle are also described.

18 Claims, 3 Drawing Sheets

CONTROL METHOD FOR THE AUTOMATED CONTROL OF A TRANSVERSE DEVIATION AND/OR A STEERING WHEEL ANGLE OF A MOTOR VEHICLE, CONTROLLER, AND MOTOR VEHICLE

CROSS-REFERENCE TO RELATED APPLICATION

This application claims priority to German Priority Application No. 102022211644.5, filed Nov. 4, 2022, the disclosure of which is incorporated herein by reference in its entirety.

TECHNICAL FIELD

The disclosure relates to a control method for the automated control of a transverse deviation and/or a steering wheel angle of a motor vehicle by way of a control loop. The disclosure furthermore relates to a controller for a motor vehicle, and to a motor vehicle.

BACKGROUND

In motor vehicles having an electromechanically assisted steering system, the electromechanical steering assistance may apply a torque to the steering system and thus assist the driver with steering or steer the motor vehicle (partially) automatically.

The automatic steering of motor vehicles is used in control systems of at least partially autonomously driven motor vehicles. One example of such a control system is lane keep assistance systems that assist the driver with keeping in a lane. Another example is autonomous control systems that at least sometimes steer the motor vehicle fully automatically, for example when parking.

When developing control loops for such control systems, it should be borne in mind that the controlled system is typically non-linearly dependent on the speed of the motor vehicle. This problem is solved in the prior art by providing controller parameters for various speed ranges.

In other words, the controller parameters thus have to be determined separately for each speed range. As a result, several hundred controller parameters have to be set for each vehicle type.

SUMMARY

A control method for the automated control of a transverse deviation and/or a steering wheel angle of a motor vehicle in which fewer controller parameters have to be set is needed.

Accordingly, a control method for the automated control of a transverse deviation and/or a steering wheel angle of a motor vehicle by way of an overall control loop is disclosed herein. The overall control loop has a first control module, a second control module, and at least one controlled system. The at least one controlled system comprises a front-axle actuator of the motor vehicle and/or a steering wheel of the motor vehicle. A provisional manipulated variable is determined by way of the first control module, wherein the provisional manipulated variable is independent of a speed of the motor vehicle. A final manipulated variable for the at least one controlled system is determined based on the provisional manipulated variable by way of the second control module, wherein the second control module compensates for a speed dependency of the at least one controlled system.

The disclosure is based on the basic concept of compensating for the speed dependency of the at least one controlled system by way of the second control module. The first control module may thereby be developed independently of the speed of the motor vehicle, as a result of which the number of controller parameters to be set is significantly reduced.

More specifically, it turns out that only eight controller parameters have to be set for the first control module, and not several hundred as with previously known approaches.

Input variables of the first control module, for example disturbances taken into consideration, may be dependent on the speed of the motor vehicle. However, the controller parameters of the first control module and output variables of the first control module nevertheless remain independent of the speed of the motor vehicle.

The method according to the disclosure makes it possible to control the transverse deviation of the motor vehicle, more precisely the transverse deviation between the center of gravity of the motor vehicle and a reference trajectory.

In this case, the control variable is thus a deviation of an actual trajectory of the motor vehicle from the reference trajectory of the motor vehicle.

Here and below, a "reference trajectory" should be understood to mean a planned trajectory for the motor vehicle, which is provided for example by a (partially) autonomous driving system based on camera data, radar sensor data, lidar sensor data and/or other sensor data.

As an alternative or in addition, the method according to the disclosure makes it possible to control the steering wheel angle.

In the case of steer-by-wire steering systems, that is to say in the case of steering systems without a mechanical connection between the steering wheel and the steering rack of the motor vehicle, it is also conceivable, for example, for the transverse deviation and the steering wheel angle to be controlled independently of one another. By way of example, in the event of fast steering movements of the motor vehicle, the steering wheel may thus follow the actual steering movements more slowly in order to avoid jerky movements of the steering wheel.

The method according to the disclosure therefore makes it possible to develop highly precise control of the transverse deviation, with at the same time jerk-free movements of the steering wheel being achieved.

Of course, it is also conceivable for the control of the transverse deviation to be supplemented with vehicle speed control, so as to achieve automatic trajectory follow-up control that automatically controls a transverse and longitudinal movement of the motor vehicle.

According to one aspect of the disclosure, the first control module is based on a first mathematical model of the at least one controlled system, wherein the first mathematical model corresponds to a non-linear model of the at least one controlled system from which the speed dependency is isolated. The model parameters underpinning the first mathematical model are thus independent of the speed of the motor vehicle.

In other words, the non-linear model of the at least one controlled system is thus divided into a speed-dependent portion and a speed-independent portion, wherein the first mathematical model corresponds to the speed-independent portion.

A further aspect of the disclosure makes provision that the second control module is based on a second mathematical model of the at least one controlled system, wherein the second mathematical model corresponds to a speed-dependent portion of a non-linear model of the at least one controlled system from which the speed dependency is isolated. The model parameters underpinning the second mathematical model are thus dependent on the speed of the motor vehicle.

In other words, the non-linear model of the at least one controlled system is thus divided into a speed-dependent portion and a speed-independent portion, wherein the second mathematical model corresponds to the speed-dependent portion.

In one exemplary arrangement of the disclosure, the first control module has a disturbance variable estimator, wherein unknown disturbance variables are estimated by way of the disturbance variable estimator. Taking the unknown disturbance variables into consideration ensures robust control of the transverse deviation, since it is possible to compensate for example for model errors and measurement uncertainties in the at least one controlled system.

The unknown disturbance variables may comprise for example model errors, in particular model errors of the first mathematical model and/or of the second mathematical model. As an alternative or in addition, the unknown disturbance variables may comprise parameter changes, a force exerted on the motor vehicle by crosswinds, an inclined road and/or a road curvature.

According to a further exemplary arrangement of the disclosure, the disturbance variable estimator determines the unknown disturbance variables based on a reference trajectory for the motor vehicle, measured variables of the at least one controlled system and/or the provisional manipulated variable. For example, a curvature of the reference trajectory is multiplied by the square of the vehicle speed in order to obtain a virtual disturbance force. The curvature of the reference trajectory may thus be taken into consideration as a disturbance variable.

Here and below, a "measured variable" should be understood to mean a variable that is able to be measured directly by way of appropriate sensors of the at least one controlled system or derived from these measurements.

The measured variables of the controlled system comprise for example an actual steering angle, an actual steering wheel angle, a motor position of an actuator of the at least one controlled system, etc.

One aspect of the disclosure makes provision that the unknown disturbance variables are assumed to be constant over a prediction horizon.

In one exemplary arrangement, at least one pre-filter, in particular at least one low-pass filter, is provided between the first control module and the second control module. Generally speaking, the pre-filter prevents excessively jerky steering movements and/or steering wheel movements. Furthermore, the pre-filter makes it possible to compensate for differences between a sample time of the detection of a deviation of the actual trajectory from the reference trajectory and a sample time of the steering angle control.

If the steering angle and the steering wheel angle are controlled separately from one another, for example in the case of steer-by-wire steering systems, various pre-filters may be used to control the transverse deviation and to control the steering wheel angle. By way of example, in the event of fast steering movements of the motor vehicle, the steering wheel may thus follow the actual steering movements more slowly in order to avoid jerky movements of the steering wheel.

The method according to the disclosure therefore makes it possible to develop highly precise control of the transverse deviation, with at the same time jerk-free movements of the steering wheel being achieved.

According to one aspect of the disclosure, the second control module inverts the speed dependency of the at least one controlled system in real time in order to compensate for the speed dependency of the at least one controlled system. Real-time inversion of the speed dependency makes it possible to determine the final manipulated variable in real time, such that the transverse deviation and/or the steering wheel angle are/is controlled in real time.

For example, the second control module inverts the speed dependency by way of a virtual control loop and feedback linearization. Applying feedback linearization usually requires a linear affine input and no direct accessing of the non-linear controlled system. Both prerequisites may be satisfied by extending the controlled system equations to the virtual control loop by way of a first-order delay element.

A controller for a motor vehicle is also disclosed. The controller is configured to perform a control method as described above.

The controller is configured to control the motor vehicle at least partially automatically, and in one exemplary arrangement, fully automatically.

The controller may for example be part of a driving assistance system, such as for example a lane-keeping system.

With regard to the further advantages and properties of the controller, reference is made to the above explanations with regard to the control method, which apply equally to the controller, and vice versa.

A motor vehicle having a controller as described above is also disclosed.

With regard to the further advantages and properties of the motor vehicle, reference is made to the above explanations with regard to the control method and the controller, which apply equally to the motor vehicle, and vice versa.

BRIEF DESCRIPTION OF DRAWINGS

Further advantages and properties of the disclosure will become apparent from the following description and the accompanying drawings, to which reference is made. In the figures.

DETAILED DESCRIPTION

Figure 1:
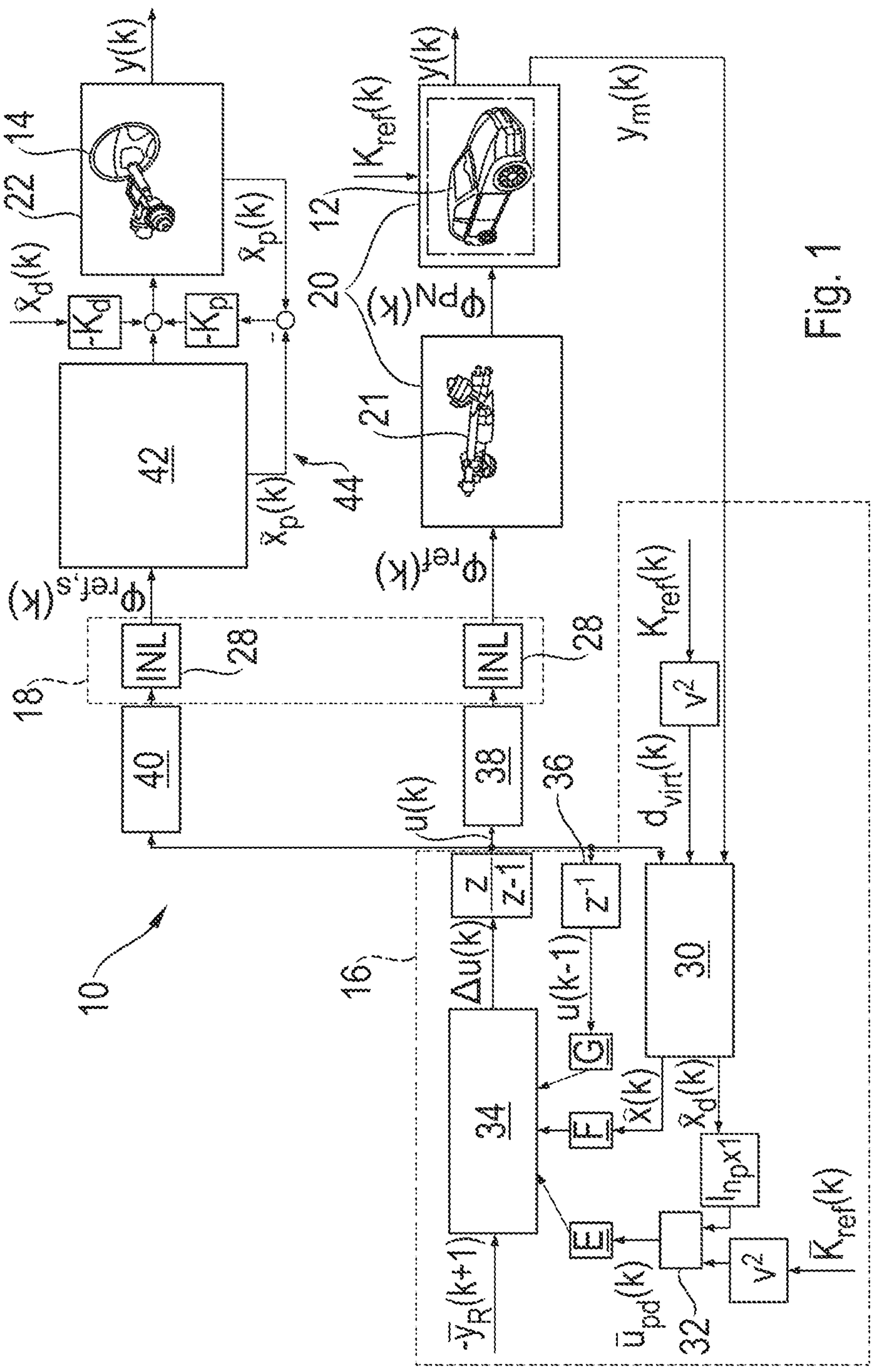
FIG. 1 schematically shows an overall control loop for performing a method according to the disclosure.

FIG. 1 schematically shows an overall control loop 10 for controlling a transverse deviation of a motor vehicle 12 and/or a steering wheel angle of a steering wheel 14 of the motor vehicle 12.

The overall control loop 10 is for example implemented at least partially in a controller of the motor vehicle.

Generally speaking, the controller is configured to control at least one lateral movement (that is to say a transverse movement) of the motor vehicle at least partially automatically, and in one exemplary arrangement, fully automatically.

The overall control loop 10 has a first control module 16, a second control module 18, a first controlled system 20 and a second controlled system 22.

The first controlled system 20 comprises a front-axle actuator 21 of the motor vehicle 12, which comprises a steering rack of the motor vehicle 12, wherein the front-axle actuator 21 is configured to steer the motor vehicle 12.

The second controlled system comprises the steering wheel 14 and a steering wheel actuator by way of which a torque is able to be applied to the steering wheel 14.

Here and below, without restricting generality, it will be assumed that the motor vehicle has a steer-by-wire steering system, that is to say that there is no mechanical operative connection between the steering wheel 14 and the steering rack.

However, the following explanations apply equally to steering systems having a mechanical operative connection between the steering wheel 14 and the steering rack, in which case for example only the transverse deviation or the steering wheel angle is then controlled.

An explanation is given below, by way of example for a steering angle-controlled front axle actuator 21, of a non-linear mathematical model on which the control loop 10 is based.

The main dynamics of steering angle control of the front-axle actuator 21 are determined by a dominant pair of poles. The transmission behavior may therefore be approximated by a second-order delay element with a Butterworth attenuation D and natural loop frequency $\omega_0$:

$$\begin{bmatrix} \dot{\varphi}_{PN} \\ \dot{\Omega}_{PN} \end{bmatrix} = \begin{bmatrix} 0 & 1 \\ -\omega_o^2 & -2D\omega_o \end{bmatrix} \begin{bmatrix} \varphi_{PN} \\ \Omega_{PN} \end{bmatrix} + \begin{bmatrix} 0 \\ \omega_o^2 \end{bmatrix} [\varphi_{ref}] \quad (1)$$

$$[\varphi_{PN}] = [1 \quad 0] \begin{bmatrix} \varphi_{PN} \\ \Omega_{PN} \end{bmatrix}$$

Here, $\varphi_{PN}$ is the steering angle, $\Omega_{PN}$ is the steering angle speed and $\varphi_{ref}$ is a reference steering angle, that is to say a final manipulated variable for the first controlled system 20.

A non-linear, dynamic, single-track model of the motor vehicle 12 is used to describe the lateral movement of the motor vehicle 12. This model may be derived from the equilibrium of forces and torque equilibrium at the center of mass of the motor vehicle 12, with a constant speed v=konst. of the motor vehicle 12 being assumed.

The following non-linear differential equations are obtained with the steering angle $\varphi_{PN}$ as setpoint value and external forces $F_{y,d}$ and torques $T_{z,d}$ as disturbance variables (for example caused by crosswinds):

$$\dot{\beta} = \frac{1}{mv}[F_f\cos(i_s\varphi_{PN} - \beta) + F_r\cos(\beta) + F_{y,d}\cos(\beta)] - \dot{\psi} \quad (2)$$

$$\ddot{\psi} = \frac{1}{J_z}[F_f l_f\cos(i_s\varphi_{PN}) - F_r l_r + T_{z,d}].$$

Here, $\beta$ is a camber angle of the motor vehicle 12, $l_f$ is a distance of the front axle from the center of mass of the motor vehicle 12, $l_r$ is a distance of the rear axle from the center of mass of the motor vehicle 12, $i_s$ is a steering ratio, $F_f$ is a lateral force of the front axle, $F_r$ is a lateral force of the rear axle and m is the mass of the motor vehicle 12.

The transverse rigidities may be adapted to the current driving situation. Any suitable mathematical tire model may be used here, for example the Pacejka model:

$$F_f = D_f\sin[C_f\arctan(B_f\tan(\alpha_f) - E_f(B_f\tan(\alpha_f) - \arctan(B_f\tan(\alpha_f))))] \quad (3)$$

$$F_r = D_r\sin[C_r\arctan(B_r\tan(\alpha_r) - E_r(B_r\tan(\alpha_r) - \arctan(B_r\tan(\alpha_r))))]$$

$$\alpha_f = i_s\varphi_{PN} - \beta - \frac{l_f\dot{\psi}}{v}$$

$$\alpha_r = -\beta + \frac{l_r\dot{\psi}}{v}$$

Figure 2:
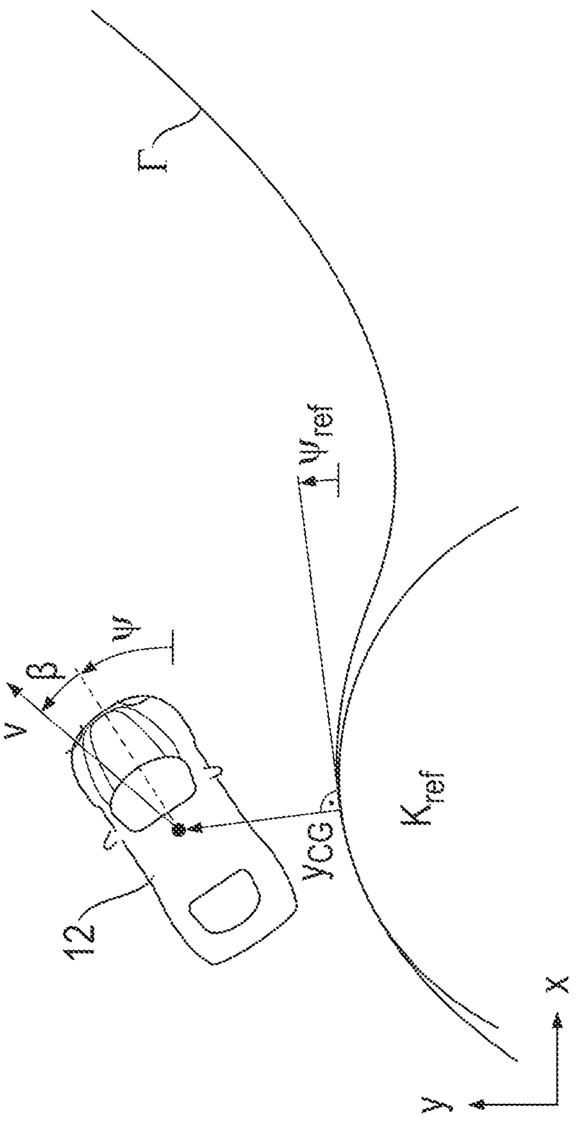
FIG. 2 shows a diagram illustrating the deviation of a motor vehicle from a reference trajectory.

FIG. 2 illustrates a movement of the motor vehicle 12 relative to a reference trajectory Γ.

To describe this movement, the model equations (2) are extended by error equations. The error equations comprise a lateral position error $y_{CG}$ and a yaw angle error $\Delta\psi=\psi-\psi_{ref}$ with respect to the point on the reference trajectory Γ at the smallest distance from the motor vehicle 12.

It is assumed here that the reference trajectory r may be approximated locally by circular segments of curvature $\kappa_{ref}=1/R_{ref}$, wherein $R_{ref}$ is the radius of the respective circular segment.

Assuming small yaw angle errors, this gives $$\dot{y}_{CG} = v\ \sin(\Delta\psi + \beta) \approx v(\Delta\psi + \beta) \quad (4)$$

$$\Delta\dot{\psi} = \dot{\psi} - vk_{ref}.$$

Figure 3:
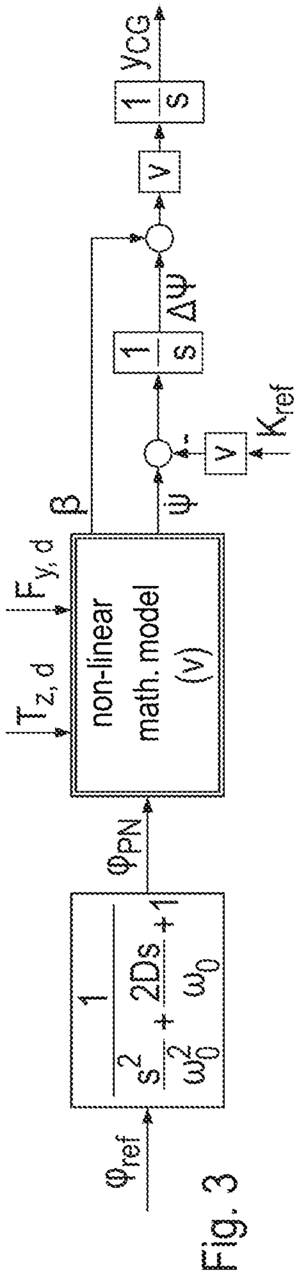
FIG. 3 shows a mathematical model for describing a transverse movement of a motor vehicle.

Combining equations (1), (2) and (4) gives the non-linear mathematical model, shown in FIG. 3, of the transverse dynamics of the motor vehicle 12.

The mathematical model shown in FIG. 3 may be restructured in order to isolate the speed dependency of the model from the speed v of the motor vehicle 12.

Figure 4:
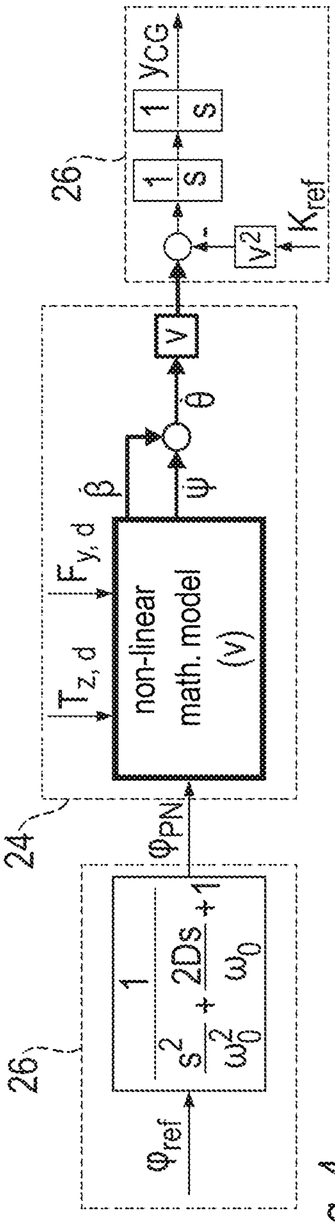
FIG. 4 shows a restructured mathematical model corresponding to the mathematical model from FIG. 3.

The restructured mathematical model is shown in FIG. 4. The restructured model has a speed-dependent portion 24 and a speed-independent portion 26 (with the exception of disturbance variables), wherein the speed-independent portion 26 is linear.

Generally speaking, the inverse of the speed-dependent portion 24 is replicated in the second control module 18, while the speed-independent portion 26 is replicated in the first control module 16.

In other words, the speed-dependent portion 24 is used to develop the second control module 18, while the speed-independent portion 26 is used to develop the first control module 16.

As shown in FIG. 1, the second control module 18 has an inversion unit ("Inverse Nonlinearity Control", INL) 28 that is configured to compensate for a speed dependency of the first controlled system 20.

More specifically, the inversion unit 28 is configured to invert the speed dependency of the first controlled system 20 by way of a virtual control loop and feedback linearization in real time in order to compensate for the speed dependency of the first controlled system 20.

The inversion unit 28 is developed here based on the speed-dependent portion 24.

Applying feedback linearization usually requires a linear affine input and no direct accessing of the corresponding non-linear controlled system. Both prerequisites may be satisfied by extending the controlled system equations to the virtual control loop by way of a first-order delay element.

The virtual control loop is described by the following equations:

$$\dot{\varphi}_{PN} = -\omega_c\varphi_{PN} + \omega_c\varphi_{PN}^* \tag{5}$$

$$\dot{\beta} = \frac{1}{mv}[F_f\cos(i_s\varphi_{PN} - \beta) + F_r\cos(\beta)] - \dot{\psi}$$

$$\ddot{\psi} = \frac{1}{J_z}[F_f l_f\cos(i_s\varphi_{PN}) - F_r l_r]$$

$$v\dot{\theta} = \frac{1}{m}[F_f\cos(i_s\varphi_{PN} - \beta) + F_r\cos(\beta)]$$

$$F_f = D_f\sin[C_f\arctan(B_f\tan(\alpha_f) - E_f(B_f\tan(\alpha_f) - \arctan(B_f\tan(\alpha_f))))]$$

$$F_r = D_r\sin[C_r\arctan(B_r\tan(\alpha_r) - E_r(B_r\tan(\alpha_r) - \arctan(B_r\tan(\alpha_r))))]$$

$$\alpha_f = i_s\varphi_{PN} - \beta - \frac{l_f\dot{\psi}}{v}$$

$$\alpha_r = -\beta + \frac{l_r\dot{\psi}}{v}$$

Here, θ is the heading angle of the motor vehicle 12, wherein the heading angle θ is equal to the sum of the yaw angle ψ and the sideslip angle β, that is to say θ=ψ+β.

These equations may be translated into the following standard form:

$$\dot{x} = a(x) + b(x)u \tag{6}$$

$$y = c(x)$$

A feedback linearization controller may be developed for these equations. For this purpose, the Lie derivatives for the output variables y are determined until an input variable u≠0 occurs.

By calculating the Lie derivatives $$L_a^0c(x),\ L_a^1c(x) \text{ and } L_bc(x),$$

it is possible to show that this input variable u occurs after the first derivative, which implies a difference in order of δ=1.

The states x are translated into new states z by way of a diffeomorphism z=T(x):

$$z = T(x) = \begin{bmatrix} z_1 \\ z_2 \\ z_3 \end{bmatrix} = \begin{bmatrix} L_a^0c(x) \\ x_2 \\ x_3 \end{bmatrix}$$

The diffeomorphism T(x) here is constantly differentiable and the reverse representation $x=T^{-1}(z)$ exists.

The transformation of the original system described by equations (6) results in the following system representation:

$$\begin{bmatrix} \dot{z}_1 \\ \dot{z}_2 \\ \dot{z}_3 \end{bmatrix} = \begin{bmatrix} L_a^1c(x) \\ \dot{T}_2(x) \\ \dot{T}_3(x) \end{bmatrix} + \begin{bmatrix} L_bc(x) \\ 0 \\ 0 \end{bmatrix}u \tag{7}$$

$$[y] = z_1.$$

To compensate for the non-linearity in the first line of equation (7), the following control rule is defined:

$$u = \frac{-L_a^1c(x) - a_0z_1 + a_0r}{L_bc(x)}. \tag{8}$$

Figure 5:
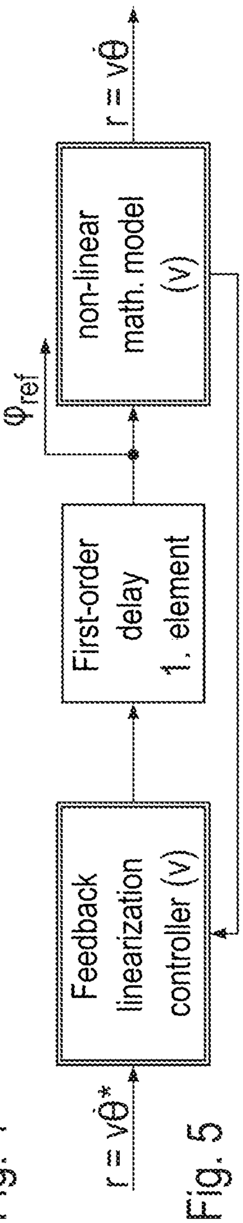
FIG. 5 schematically shows an inversion unit of the control loop from FIG. 1.

The resulting virtual control loop of the inversion unit 28 is shown in FIG. 5.

The transfer path from r to $\varphi_{ref}$ provides the desired inversion of the non-linear dependency of the first controlled system 20 on the speed v of the motor vehicle 12.

By applying the final manipulated variable $\varphi_{ref}$ to the first controlled system 20, the speed-dependent dynamics of the first controlled system 20 are compensated for in full.

The remaining dynamics of the first controlled system 20 may be described by the following equations:

$$\dot{x} = A^cx + B^cu + B_{pd}^cu_{pd} \tag{9}$$

$$y = C^cx$$

Here, the vectors or matrices are defined by:

$$\begin{bmatrix} v\Delta\dot{\theta} \\ \dot{y}_{CG} \\ \dot{\varphi}_{PN} \\ \dot{\Omega}_{PN} \\ \dot{x}_F \end{bmatrix} = \begin{bmatrix} 0 & 0 & 1 & 0 & 0 \\ 1 & 0 & 0 & 0 & 0 \\ 0 & 0 & 0 & 1 & 0 \\ 0 & 0 & -\omega_o^2 & -2D\omega_o & \omega_o^2 \\ 0 & 0 & 0 & 0 & -\omega_F \end{bmatrix} \begin{bmatrix} v\Delta\theta \\ y_{CG} \\ \varphi_{PN} \\ \Omega_{PN} \\ x_F \end{bmatrix} + \begin{bmatrix} 0 \\ 0 \\ 0 \\ 0 \\ \omega_F \end{bmatrix}[u] + \begin{bmatrix} -1 & -1 \\ 0 & 0 \\ 0 & 0 \\ 0 & 0 \\ 0 & 0 \end{bmatrix} \begin{bmatrix} d_{virt} \\ d_{unk} \end{bmatrix} \tag{10}$$

$$\begin{bmatrix} y_{CG} \\ \dot{y}_{CG} \end{bmatrix} = \begin{bmatrix} 0 & 1 & 0 & 0 & 0 \\ 1 & 0 & 0 & 0 & 0 \end{bmatrix} \begin{bmatrix} v\Delta\theta \\ y_{CG} \\ \varphi_{PN} \\ \Omega_{PN} \\ x_F \end{bmatrix}.$$

Here, $d_{virt}=v^2\kappa_{ref}$ and $d_{unk}=v^2\kappa_{unk}$ correspond to known or unknown virtual disturbances. Furthermore, $\Omega_{PN}$ is a steering angle speed.

Equations (9) are discretized, for example with a step-invariant discretization with a sample time Ts=0.05 s. This gives the following discretized equations:

$$x(k+1) = Ax(k) + Bu(k) + B_{pd}u_{pd}(k) \tag{11}$$

$$y(k) = Cx(k)$$

$$y_m(k) = C_mx(k)$$

-continued $$A = e^{A^c T_s},\ B = \left(\int_0^{T_s} e^{A^c \eta} d\eta\right) B^c,\ B_{pd} = \left(\int_0^{T_s} e^{A^c \eta} d\eta\right) B^c_{pd}$$

$$C = C^c,\ C_m = C^c_{1,1:4}$$

The first control module 16 is developed based on equations (11).

Generally speaking, the goal of the first control module 16 is to provide a provisional manipulated variable u(k) so that the lateral position error $y_{CG}(k)$ is minimized.

The output variables of the first controlled system 20 already comprise the lateral position error and a lateral error speed of the motor vehicle 12. The vector of the future reference variables may therefore be set to zero.

A disturbance $\kappa_{ref}(k)$ (see also FIG. 2) is provided by trajectory planning over an overall prediction horizon $n_p$.

A disturbance sequence measured in the future $$\bar{\kappa}^T_{ref} = [\kappa_{ref}(k)\ \kappa_{ref}(k+1)\ \ldots\ \kappa_{ref}(k+n_p-1)]$$

is estimated assuming that the motor vehicle follows the reference trajectory Γ at a constant speed and without deviations.

The measured disturbance is multiplied by $v^2$ to obtain the virtual disturbance $\bar{d}_{virt}(k)$.

The unknown disturbance $d_{unk}(k)$, which comprises for example disturbances caused by crosswinds, model errors, an inclined road and/or a road curvature, is estimated by way of a disturbance variable estimator 30, which is explained in more detail below.

To develop the disturbance variable estimator 30, the speed-independent portion 26 of the mathematical model described above is extended by a disturbance model in the case of an unknown disturbance input $d_{unk}(k)$:

$$x_a(k+1) = A_a x_a(k) + B_a u_a(k) \qquad (12)$$

$$y_a(k) = C_a x_a(k)$$

The vectors and matrices are defined here as follows:

$$\begin{bmatrix} x(k+1) \\ x_d(k+1) \end{bmatrix} = \begin{bmatrix} A & B_{pd(:,2)} \\ 0 & 1 \end{bmatrix} \begin{bmatrix} x(k) \\ x_d(k) \end{bmatrix} + \begin{bmatrix} B & B_{pd(:,1)} & 0 \\ 0 & 0 & T_s \end{bmatrix} \begin{bmatrix} u(k) \\ d_{virt}(k) \\ u_d(k) \end{bmatrix}$$

$$[y_m(k)] = [C_m\ \ 0] \begin{bmatrix} x(k) \\ x_d(k) \end{bmatrix}.$$

It is assumed that the extended model of equation (12) is influenced by process noise w(k) and measurement noise ν(k) with covariances $E[w\ w^T]=W$ and $E[\nu\ \nu^T]=V$, wherein W>0 and V>0.

It is furthermore assumed that the process noise is additive to the input variables in order to "penalize" the unknown input variable $u_d(k)$, corresponding to the unknown disturbances $d_{unk}(k)$, of the disturbance model.

An estimate of the optimum state $\hat{x}_a(k)$ that minimizes the stationary value of the following cost function $J_d$ is required:

$$J_d = \lim_{k\to\infty} tr\left[E\{x_a(k) - \hat{x}_a(k)\}\{x_a(k) - \hat{x}_a(k)\}^T\right] = \lim_{k\to\infty} tr[P_e(k)] = tr[P^*_e(k)]. \qquad (13)$$

This problem is solved by the state estimator, $$\hat{x}_a(k+1) = (A_a - L\ C_a)\hat{x}_a(k) + B_a u_a(k) + L y_a(k), \qquad (14)$$

which minimizes the cost function $J_d$ over the time interval [0, ∞]. The optimum feedback matrix ("feedback gain matrix") L results as $$L = A_a P^*_e C^T_a \left(C_a P^*_e C^T_a + V\right)^{-1}. \qquad (15)$$

Here, $$P^*_e$$

is the stationary solution of the discrete algebraic Riccati equation:

$$P^*_e = A_a\left[P^*_e - P^*_e C^T_a \left(C_a P^*_e C^T_a + V\right)^{-1} C_a P^*_e\right] A^T_a + B_a W B^T_a. \qquad (16)$$

The unknown disturbance $d_{unk}(k)$ is assumed to be constant over the overall prediction horizon $n_p$.

The unknown disturbance $d_{unk}(k)$ is multiplied by a unit vector $$I_{n_p \times 1}$$

of appropriate length and combined with the virtual disturbance in a combination unit 32, thereby giving a disturbance sequence $\bar{u}_{pd}(k)$.

The disturbance sequence $\bar{u}_{pd}(k)$ is multiplied by a first system matrix E and supplied to an optimization unit 34.

A state vector $\hat{x}(k)$ is multiplied by a second system matrix F and is likewise supplied to the optimization unit 34.

A provisional manipulated variable u(k−1) determined in the last iteration is provided via a delay element 36, multiplied by a third system matrix G and supplied to the optimization unit 34.

The optimization unit 34 determines an optimal provisional manipulated variable u(k) by solving a quadratic optimization problem under constraints.

To this end, the following cost function J is defined:

$$J = \sum_{i=1}^{n_p} \|Q^*[y(k+i)]\|^2 + r^* \sum_{i=0}^{n_c-1} \|[\Delta u(k+i)]\|^2 \qquad (17)$$

Here, Q* and r* are weighting matrices that "penalize" lateral position errors, lateral error speeds and changes to the provisional manipulated variable, that is to say increase the value of the cost function J.

The cost function J is minimized in terms of Δu under the following constraints:

$$u_{min} \leq u(k+i) \leq u_{max}, i=0, \ldots, n_c-1. \quad (18)$$

Here, $$\Delta\overline{u}^T = [\Delta u(k), \ldots, \Delta u(k+n_c-1)].$$

The constraints replicate for example the mechanical limits of the steering angle, that is to say a maximum rotation of the wheels of the motor vehicle 12.

To compensate for differences in the sample times between the detection of a deviation of the actual trajectory from the reference trajectory Γ (typically $T_s \approx 0.05$ s) and the steering angle control (typically $T_s \approx 0.001$ s), a pre-filter 38 is provided between the first control module 16 and the second control module 18.

The pre-filter 38 is designed for example as a low-pass filter with a cut-off frequency $\omega_F$.

The control loop shown in FIG. 1 makes it possible to independently control the transverse deviation and the steering wheel angle.

To control the steering wheel angle, provision may be made for a further pre-filter 40 that is arranged between the first control module 16 and the second control module 18.

The further pre-filter 40 is preferably configured such that jerky movements of the steering wheel 14 are avoided.

The further pre-filter 40 is designed for example as a low-pass filter with a cut-off frequency $\omega'_F \neq \omega_F$.

The inversion unit 28, as described above, also provides a final manipulated variable $\varphi_{ref,s}(k)$ for controlling the steering wheel angle.

The final manipulated variable $\varphi_{ref,s}(k)$ is fed into a steering wheel angle control loop 44 via a dynamic reference feedforward 42, wherein the steering wheel angle control loop 44 comprises the second controlled system 22.

The steering wheel angle control loop 44 is configured to control the steering wheel angle based on the manipulated variable $\varphi_{ref,s}(k)$ by virtue of a steering wheel actuator of the second controlled system 22 being controlled appropriately.

By way of example, a torque applied to the steering wheel by the steering wheel actuator is controlled appropriately.

The invention claimed is:

1. A control method for automated control of a transverse deviation and/or a steering wheel angle of a motor vehicle by an overall control loop, the method comprising:

determining, by a first control module of the overall control loop, a provisional manipulated variable using a speed-independent mathematical model of a controlled system; wherein the provisional manipulated variable is independent of a speed of the motor vehicle;

determining, by a second control module of the overall control loop a first rack force value using a speed-dependent portion of a non-linear vehicle dynamics model;

determining, by the second control module, a second rack force value using a speed-independent portion of the non-linear vehicle dynamics model;

forming, by the second control module, a quotient by dividing the first rack force value by the second rack force value;

generating, by the second control module, a feedback force value by modifying the second rack force value using the quotient;

inverting, by the second control module, speed-dependent vehicle dynamics in real time by applying feedback linearization via a virtual control loop; and generating, by the second control module, a final manipulated variable based on the feedback force value; and applying the final manipulated variable to a front-axle actuator and/or steering wheel actuator of the motor vehicle to control vehicle lateral motion of the motor vehicle in real time.

2. The control method as claimed in claim 1, wherein the first control module is based on a first mathematical model of the at least one controlled system, wherein the first mathematical model corresponds to a non-linear model of the at least one controlled system from which the speed dependency is isolated.

3. The control method as claimed in claim 1, wherein the second control module is based on a second mathematical model of the at least one controlled system, wherein the second mathematical model corresponds to a speed-dependent portion of a non-linear model of the at least one controlled system.

4. The control method as claimed in claim 1, wherein the first control module has a disturbance variable estimator, wherein unknown disturbance variables are estimated by way of the disturbance variable estimator.

5. The control method as claimed in claim 4, wherein the disturbance variable estimator determines the unknown disturbance variables based on a reference trajectory for the motor vehicle, measured variables of the at least one controlled system and/or the provisional manipulated variable.

6. The control method as claimed in claim 4, wherein the unknown disturbance variables are assumed to be constant over a prediction horizon.

7. The control method as claimed in claim 1, wherein at least one pre-filter is provided between the first control module and the second control module.

8. The control method as claimed in claim 1, wherein the second control module inverts the speed dependency of the at least one controlled system in real time in order to compensate for the speed dependency of the at least one controlled system.

9. The control method as claimed in claim 8, wherein the second control module inverts the speed dependency by way of a virtual control loop and feedback linearization.

10. A controller for a motor vehicle, wherein the controller is configured to perform a control method as claimed in claim 1.

11. A motor vehicle having a controller as claimed in claim 10.

12. The control method as claimed in claim 2, wherein the second control module is based on a second mathematical model of the at least one controlled system, wherein the second mathematical model corresponds to a speed-dependent portion of a non-linear model of the at least one controlled system.

13. The control method as claimed in claim 12, wherein the first control module has a disturbance variable estimator, wherein unknown disturbance variables are estimated by way of the disturbance variable estimator.

14. The control method as claimed in claim 5, wherein a curvature of the reference trajectory is multiplied by a square of vehicle speed to obtain a virtual disturbance force.

15. The control method as claimed in claim 14, wherein the unknown disturbance variables are assumed to be constant over a prediction horizon.

16. The control method as claimed in claim 14, wherein at least one pre-filter is provided between the first control module and the second control module.

17. The control method as claimed in claim 14, wherein the second control module inverts the speed dependency of the at least one controlled system in real time in order to compensate for the speed dependency of the at least one controlled system.

18. The control method as claimed in claim 17, wherein the second control module inverts the speed dependency by way of a virtual control loop and feedback linearization.

* * * * *